United States Patent
Kim et al.

(10) Patent No.: US 10,461,357 B2
(45) Date of Patent: Oct. 29, 2019

(54) MATERIALS EXCHANGING DEVICE OF WINDING EQUIPMENT FOR A BATTERY AND METHOD OF MANUFACTURING A BATTERY USING THE MATERIALS EXCHANGING DEVICE

(71) Applicant: SAMSUNG SDI CO., LTD., Yongin-si, Gyeonggi-do (KR)

(72) Inventors: Kangmin Kim, Yongin-si (KR); Youngmin Kim, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 302 days.

(21) Appl. No.: 15/331,932

(22) Filed: Oct. 24, 2016

(65) Prior Publication Data

US 2017/0133704 A1    May 11, 2017

(30) Foreign Application Priority Data

Nov. 10, 2015    (KR) .................... 10-2015-0157467

(51) Int. Cl.
  *H01M 10/04* (2006.01)
  *H01M 10/0525* (2010.01)
  *H01M 10/0587* (2010.01)

(52) U.S. Cl.
  CPC ... *H01M 10/0409* (2013.01); *H01M 10/0431* (2013.01); *H01M 10/0525* (2013.01); *H01M 10/0587* (2013.01)

(58) Field of Classification Search
  CPC ........ H01M 10/0409; H01M 10/0431; H01M 10/0525; H01M 10/0587
  See application file for complete search history.

(56) References Cited

U.S. PATENT DOCUMENTS 6,328,249 B1 *  12/2001  Ogawa ................. B65H 19/126
                                                    242/559.2
8,534,593 B2 *   9/2013  Casey ................. B65H 19/1826
                                                    242/534

FOREIGN PATENT DOCUMENTS

| JP | 06-000535 A | 1/1994 |
| KR | 2003-0030675 A | 4/2003 |
| KR | 10-0915269 B1 | 9/2009 |
| KR | 10-2014-0105960 A | 9/2014 |

* cited by examiner

*Primary Examiner* — Sang K Kim
(74) *Attorney, Agent, or Firm* — Lee & Morse, P.C.

(57) ABSTRACT

A materials exchanging device includes a supply material unit to couple to a supply material roll and supplying materials to a winding member; and a standby material unit to couple to a standby material roll and hinged to the supply material unit, wherein an angle of the standby material roll with respect to the supply material unit varies due to hinge-rotation of the standby material unit.

12 Claims, 4 Drawing Sheets

MATERIALS EXCHANGING DEVICE OF WINDING EQUIPMENT FOR A BATTERY AND METHOD OF MANUFACTURING A BATTERY USING THE MATERIALS EXCHANGING DEVICE

CROSS-REFERENCE TO RELATED APPLICATION

Korean Patent Application No. 10-2015-0157467, filed on Nov. 10, 2015, in the Korean Intellectual Property Office, and entitled: "Materials Exchanging Device of Winding Equipment for Secondary Battery," is incorporated by reference herein in its entirety.

BACKGROUND

1. Field

Exemplary embodiments relate to a materials exchanging device of winding equipment for a secondary battery.

2. Description of the Related Art

In general, a manufacturing method of a lithium ion secondary battery may include providing an electrode assembly by stacking a first separator, a negative electrode plate, a second separator, and a positive electrode plate and winding the stacked structure, sealing the electrode assembly, and injecting an electrolyte into a case.

SUMMARY

According to exemplary embodiments, there is provided a materials exchanging device of winding equipment for a secondary battery, the materials exchanging device may a supply material unit to couple to a supply material roll and supplying materials to a winding member; and a standby material unit to couple to a standby material roll and hinged to the supply material unit, wherein an angle of the standby material roll has angle varying with respect to the supply material unit varies due to by hinge-rotation of the standby material unit.

The supply material unit may include a supply rotation shaft about which the supply material roll is rotated; and a plate unit shaped to allow the supply rotation shaft to pass therethrough.

When materials wound on the supply material roll are consumed, the supply material unit may shift the supply rotation shaft to an inside of the plate unit to replace the supply material roll with the standby material roll.

The supply rotation shaft may pass through a throughhole of the plate unit, and the throughhole may have a smaller diameter than the supply material roll.

The standby material unit may include a second plate unit hinged to the supply material unit; a coupling shaft protruding from one surface of the second plate unit and to couple to the standby material roll; and a transfer plate positioned between the standby material roll and the second plate unit and pushing the standby material roll along the coupling shaft.

The standby material unit may push the standby material roll along the coupling shaft from a position at which the coupling shaft and a rotation coupling shaft of the supply material unit are extended in a same line.

The standby material unit may further include a transfer unit including at least one pair of support members coupled to each other about a hinge shaft between the transfer plate and the second plate unit.

In an extended state of the transfer unit, the transfer plate and the second plate unit may be separated from each other by a maximum distance that is longer than or equal to a length of the coupling shaft.

The transfer unit may apply a pressure to the transfer plate.

The materials exchanging device may further include at least one guide roller protruding from the plate unit.

According to another exemplary embodiment a method of manufacturing a battery may comprise; supplying a first separator from a first separator roll, a second separator from a second separator roll, a negative electrode plate from a negative electrode plate roll, and a positive electrode plate from a positive electrode plate roll; stacking the first separator, the negative electrode plate, the second separator, and the positive electrode plate such that a stacked structure is formed; rotating the stacked structure in one direction with a winding member; exchanging one of the first separator roll, the second separator roll, the negative electrode plate roll, or the positive electrode plate roll with a standby material roll using the materials exchanging device of the exemplary embodiment.

According to an exemplary embodiment, a method of manufacturing a battery may comprise; supplying a plurality of supply material rolls, each of the supply material rolls including material of at least one of a first separator, a second separator, a negative electrode plate, and a positive electrode plate; stacking the material of the plurality of supply material rolls such that a stacked structure is formed; rotating the stacked structure in one direction with a winding member; exchanging one of the supply material rolls with a standby material roll using a materials exchanging device, wherein the materials exchanging device includes: a supply material unit coupled to at least one of the supply material rolls and supplying the material of the at least one supply material roll to the winding member; and a standby material unit coupled to the standby material roll and hinged to the supply material unit, wherein an angle of the standby material roll with respect to the supply material unit varies based on hinge-rotation of the standby material unit.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
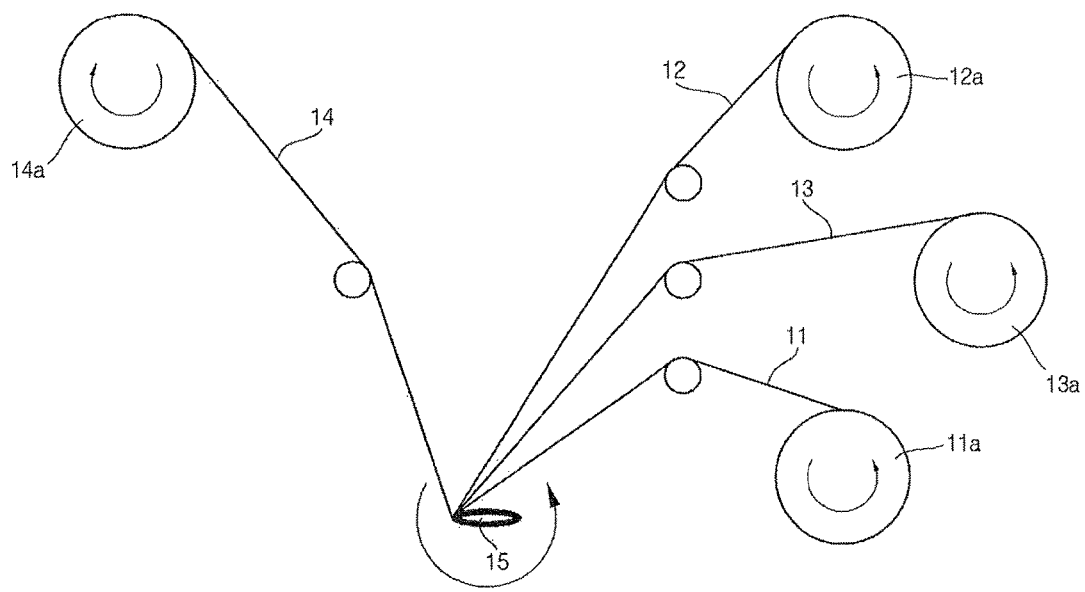
FIG. 1 illustrates a schematic diagram showing a manufacturing method of a secondary battery.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

FIG. 1 is a schematic diagram showing a manufacturing method of a secondary battery.

As shown in FIG. 1, in order to manufacture a secondary battery, a first separator 11, a second separator 12, a negative electrode plate 13 and a positive electrode plate 14 may be supplied. In more detail, the first separator 11 is supplied from a first separator roll 11a wound multiple times, the second separator 12 is supplied from a second separator roll 12a wound multiple times, the negative electrode plate 13 is supplied from a negative electrode plate roll 13a wound multiple times, and the positive electrode plate 14 is supplied from a positive electrode plate roll 14a wound multiple times.

In addition, the negative electrode plate 13 may be positioned between the first and second separators 11 and 12 and the positive electrode plate 14 may be positioned behind the second separator 12. For example, a stacked structure, including the first separator 11, the negative electrode plate 13, the second separator 12, and the positive electrode plate 14, may be provided. Additionally, the stacked structure may be rotated in one direction by a winding member 15, thereby obtaining or producing the electrode assembly having a jelly-roll configuration.

In the materials exchanging device according to the exemplary embodiment, rolls may be exchanged when the first and second separators 11 and 12, the negative electrode plate 13 and/or the positive electrode plate 14 are supplied, while reducing a volume or size of the materials exchanging device. The materials exchanging device will now be described in detail.

Figure 2:
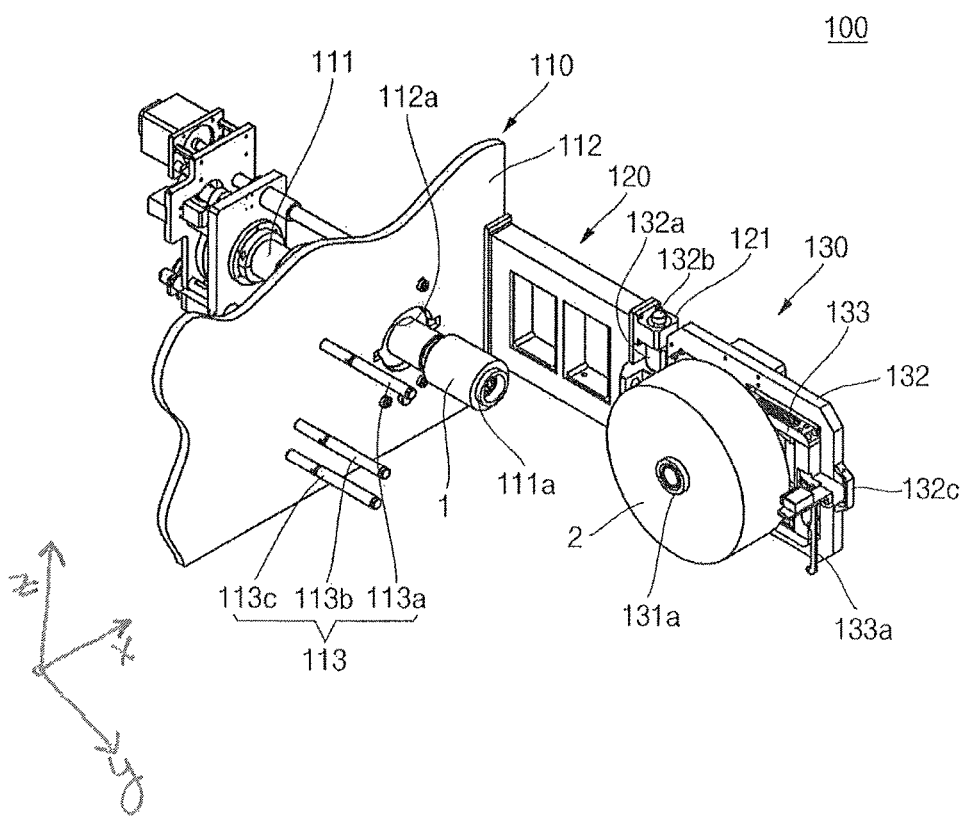
FIG. 2 illustrates a schematic diagram of a materials exchanging device of winding equipment for a secondary battery according to an embodiment.
Figure 3:
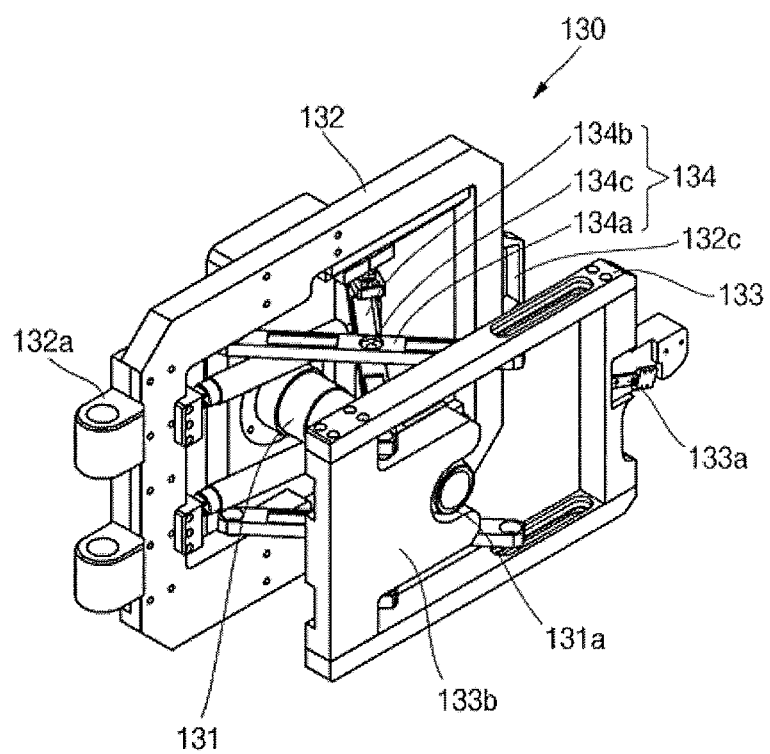
FIG. 3 illustrates a detailed diagram showing a configuration of a standby material unit for pushing standby materials in the materials exchanging device of winding equipment for a secondary battery according to an embodiment.

FIG. 2 is a schematic diagram of a materials exchanging device of winding equipment for a secondary battery according to an exemplary embodiment and FIG. 3 is a detailed diagram showing a configuration of a standby material unit for pushing standby materials in the materials exchanging device of winding equipment for a secondary battery according to an exemplary embodiment.

As shown in FIG. 2, the materials exchanging device 100 of winding equipment for a secondary battery according to an exemplary embodiment may include a supply material unit 110, a frame spacer unit 120, and a standby material unit 130.

The supply material unit 110 may include a supply rotation shaft 111 coupled to the supply material roll 1, a plate unit 112 shaped such that the supply rotation shaft 111 passes therethrough, and a guide roller unit 113 protruding from the plate unit 112.

The supply rotation shaft 111 may be coupled to a separate motor provided therein to receive a rotational force and may be rotated in a direction. The supply rotation shaft 111 may unroll a supply material from the supply material roll 1 coupled by the rotation of the supply rotation shaft 111. The supply rotation shaft 111 may horizontally shift its end 111a to which the supply material roll 1 is applied. In more detail, the supply rotation shaft 111 may be provided such that the end 111a is shifted back and forth on the same line with the supply rotation shaft 111. Therefore, if the end 111a moves forward to then be protruded and exposed to an outside of the plate unit 112, the supply material roll 1 may be coupled to the end 111a. In addition, if the end 111a moves backward to then be positioned within the plate unit 112, the end 111a may not be exposed and the supply material roll 1 coupled thereto may fall and be separated from the end 111a, which will later be described.

The plate unit 112 may be provided substantially perpendicular to the supply rotation shaft 111. The plate unit 112 may include a throughhole 112a through which the supply rotation shaft 111 passes. The plate unit 112 may be used for separating the supply material roll 1 from the supply rotation shaft 111 after materials of the supply material roll 1 are consumed. The throughhole 112a of the plate unit 112 may have a larger diameter than the supply rotation shaft 111 and a smaller diameter than the supply material roll 1, even after the materials have been consumed. When the end 111a of the supply rotation shaft 111 moves backward (e.g., in a negative y-axis direction of FIG. 2) to separate the supply material roll 1 from the end 111a of the supply rotation shaft 111, the end 111a may pass through the throughhole 112a of the plate unit 112 and move backward to an inside of the plate unit 112. However, since the supply material roll 1 having the materials consumed cannot pass through the throughhole 112a, the supply material roll 1 may be prevented from moving backward by the plate unit 112. Therefore, the supply material roll 1 having the materials consumed may be separated from the end 111a of the supply rotation shaft 111. A separate cylinder may be optionally provided, regardless of the diameter of the throughhole 112a of the plate unit 112, thereby preventing the supply material roll 1 from moving backward by being caught by the separate cylinder.

The guide roller unit 113 may include at least one guide roller (e.g., 113a, 113b, and 113c) and may protrude from the plate unit 112. For example, the guide roller unit 113 may include three guide rollers 113a, 113b, and 113c and may be substantially parallel with the supply rotation shaft 111. The guide roller unit 113 may allow the materials unwound from the supply material roll 1 to be unrolled while maintaining an appropriate tension along a predetermined path until the materials reach the winding member 15 shown in FIG. 1. To this end, the guide roller unit 113 is configured to be capable of freely axially rotating.

The frame spacer unit 120 may be coupled to and substantially perpendicular to the plate unit 112 of the supply material unit 110. The frame spacer unit 120 may have a length such that it protrudes from the plate unit 112 past the end 111a of the supply rotation shaft 111. Therefore, even if the supply material roll 1 is coupled to the end 111a of the supply rotation shaft 111, as will be described later, the standby material unit 130 may be rotated about 90 degrees to be disposed substantially parallel with the supply rotation shaft 111.

To this end, the frame spacer unit 120 may include a hinge coupling unit 121 protruding at an end coupled to the standby material unit 130. The standby material unit 130 may be engaged with the hinge coupling unit 121 and hinged thereto. Accordingly, the standby material unit 130 may be rotated more than 90 degrees about the hinge coupling unit 121.

Referring to FIGS. 2 and 3, the standby material unit 130 may be coupled to the hinge coupling unit 121 of the frame spacer unit 120. The standby material unit 130 may include a coupling shaft 131 coupled to a standby material roll 2 which is to replace the supply material roll 1 having the materials consumed, a plate unit 132 supporting the coupling shaft 131, a transfer plate 133 positioned between the plate unit 132 and the standby material roll 2 and making a surface contact with the standby material roll 2, and a transfer unit 134 for pushing the transfer plate 133 away from the plate unit 132 along the coupling shaft 131.

The coupling shaft 131 may be coupled to the standby material roll 2 in a state in which the standby material unit 130 and the frame spacer unit 120 are extended and substantially aligned. An end 131a of the coupling shaft 131 may be exposed to an outside of the standby material roll 2, thereby maintaining the standby material roll 2 at a stably coupled state.

The plate unit 132 may support the coupling shaft 131 and structures coupled to a rear surface of the coupling shaft 131. The plate unit 132 may include a hinge coupling unit 132a and a hinge shaft 132b to be coupled to the hinge coupling unit 121 of the frame spacer unit 120. The hinge coupling unit 132a of the plate unit 132 may be engaged with the hinge coupling unit 121 of the frame spacer unit 120 to be coupled thereto, and the hinge shaft 132b may pass through the hinge coupling unit 132a of the plate unit 132 from above the hinge coupling unit 132a of the plate unit 132, so that the plate unit 132 may be maintained in a state in which the plate unit 132 is hinged to the frame spacer unit 120. As such, the plate unit 132 may be rotated about the hinge shaft 132b by about 90 degrees from the position shown in FIG. 2. In addition, the plate unit 132 may include a handle 132c at its edge, thereby facilitating holding of the plate unit 132 by an operator to rotate the plate unit 132 about the hinge shaft 132b.

The transfer plate 133 may be coupled to the coupling shaft 131 and may maintain a state in which the transfer plate 133 makes surface contact with the standby material roll 2. The transfer plate 133 may move back and forth from the plate unit 132 along the coupling shaft 131. When the transfer plate 133 moves forward (e.g., in the negative y-axis direction of FIG. 4), the standby material roll 2 may be pushed from the end 131a of the coupling shaft 131 to be coupled to the supply rotation shaft 111 of the supply material unit 110. In addition, the transfer plate 133 may further include a loosened material (LM) guide unit 133a that fixes a position of the transfer plate 133. An end of the standby material roll 2 may be loosened to be fixed during a standby mode, and the LM guide unit 133a may be locked on a separate shaft (not shown). If the transfer plate 133 moves backward (e.g., in a positive y-axis direction of FIG. 4) directly after the standby material roll 2 is transferred to the supply rotation shaft 111, the material may be damaged by the separate shaft. The LM guide unit 133a may guide the transfer plate 133 backward to prevent the separate shaft from making contact with the material of the standby material roll 2 when the transfer plate 133 moves backward.

The transfer unit 134 may be positioned between the transfer plate 133 and the plate unit 132. The transfer unit 134 may be connected to the transfer plate 133 by an x-type link. In more detail, the transfer unit 134 may have at least a pair of support members 134a and 134b crossing each other in an X-letter shape, the pair of support members 134a and 134b may be hinged with respect to a hinge shaft 134c. Therefore, the support members 134a and 134b may extend or contract with respect to the hinge shaft 134c.

The transfer unit 134 may be contracted and folded during normal operation of the supply material unit 110. The transfer unit 134 may extend to push the transfer plate 133 away from the plate unit 132 when the standby material roll 2 is to be coupled to the supply rotation shaft 111 of the supply material unit 110. A maximally extended distance between the transfer plate 133 and the plate unit 132 in a state in which the transfer unit 134 is extended may be longer than or equal to a length of the coupling shaft 131. Accordingly, the transfer unit 134 may push the standby material roll 2 coupled to the coupling shaft 131 away from the coupling shaft 131 via the transfer plate 133. Therefore, the standby material roll 2 may be shifted along the coupling shaft 131 to then be coupled to the supply rotation shaft 111 of the supply material unit 110. Thereafter, the transfer unit 134 may be again contracted and folded to prepare to accommodate another standby material roll.

Hereinafter, the operation of the materials exchanging device of winding equipment for a secondary battery according to an exemplary embodiment will be described in more detail.

Figure 4:
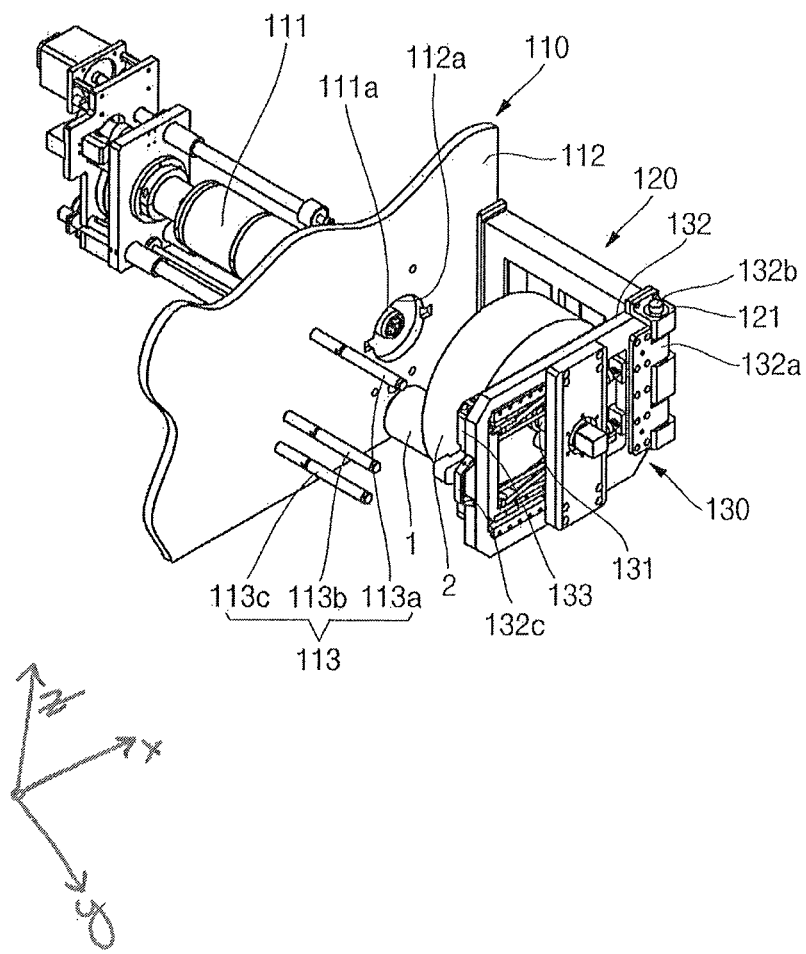
FIG. 4 illustrates a diagram showing a state in which a supply material roll is separated from a supply material unit when a standby material unit is folded in the materials exchanging device of winding equipment for a secondary battery according to an embodiment.
Figure 5:
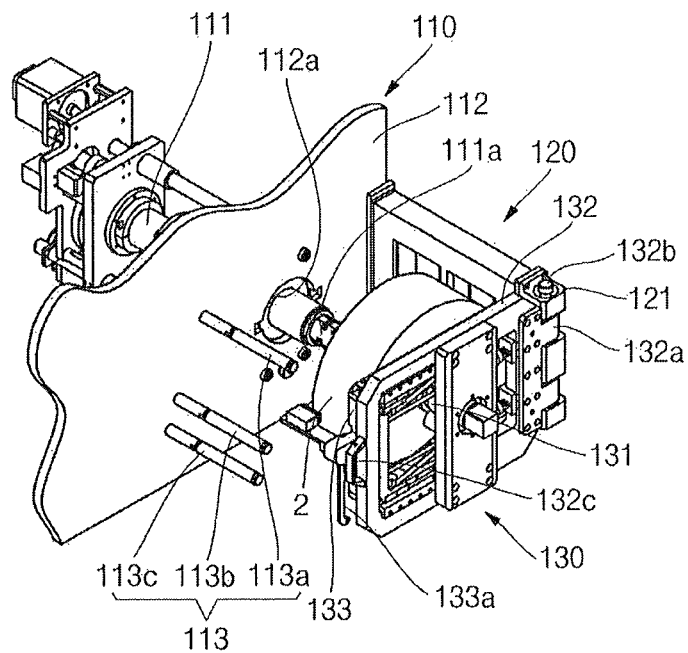
FIG. 5 illustrates a diagram showing a state in which a supply rotation shaft of a supply material unit has moved forward in the materials exchanging device of winding equipment for a secondary battery according to an embodiment.
Figure 6:
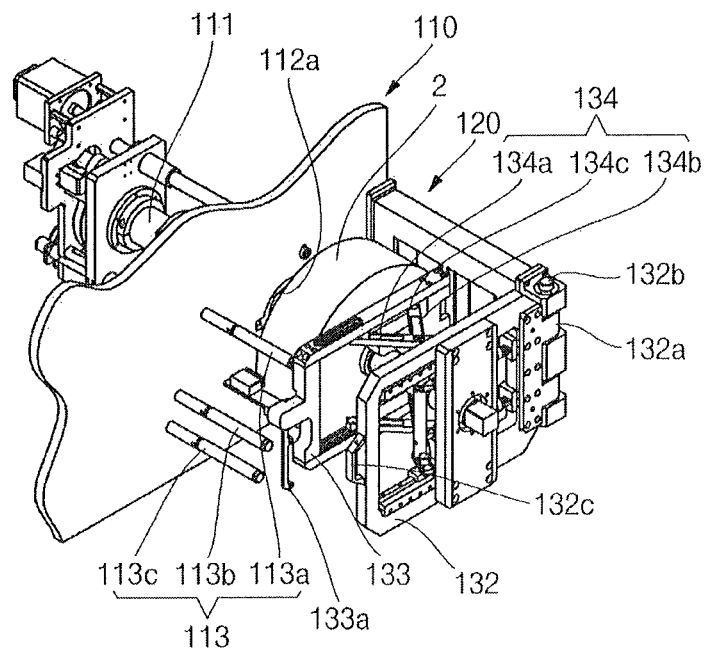
FIG. 6 illustrates a diagram showing a state in which a standby material roll is coupled to a supply rotation shaft by an operation of a pushing unit in the materials exchanging device of winding equipment for a secondary battery according to an embodiment.

FIG. 4 is a diagram showing a state in which a supply material roll is separated from a supply material unit when a standby material unit is folded in the materials exchanging device of winding equipment for a secondary battery according to an embodiment, FIG. 5 is a diagram showing a state in which a supply rotation shaft of a supply material unit has moved forward in the materials exchanging device of winding equipment for a secondary battery according to an embodiment, and FIG. 6 is a diagram showing a state in which a standby material roll is coupled to a supply rotation shaft by an operation of a pushing unit in the materials exchanging device of winding equipment for a secondary battery according to an embodiment.

Referring again to FIG. 2, in the materials exchanging device 100 of winding equipment for a secondary battery according to an exemplary embodiment, in a state in which the plate unit 132 of the standby material unit 130 is disposed to be substantially aligned with the frame spacer unit 120, the standby material roll 2 may be coupled to the coupling shaft 131. In this case, the standby material roll 2 may be maintained at an angle of about 90 degrees with respect to the supply material roll 1. In such a case, the materials exchanging device 100 occupies a smaller space than in a case where the supply material roll 1 and the standby material roll 2 are disposed to be parallel with each other. Therefore, the size of the materials exchanging device 100 may be reduced.

As shown in FIG. 4, the plate unit 132 of the standby material unit 130 may be rotated about the hinge shaft 132b such that the standby material unit 130 is disposed at an angle of about 90 degrees with respect to the frame spacer unit 120. Therefore, the coupling shaft 131 of the standby material unit 130 may be positioned to be extended on a same line as the supply rotation shaft 111 of the supply material unit 110.

Thereafter, the supply rotation shaft 111 of the supply material unit 110 moves backward (e.g., in the negative y-axis direction of FIG. 4), so that the end 111a of the supply material unit 110 may be positioned in the inside of the plate unit 112. In addition, since the throughhole 112a of the plate unit 112 may have a smaller diameter than the supply material roll 1 having the materials consumed, the supply material roll 1 may be prevented from moving to the inside of the plate unit 112. As described above, the supply material roll 1 may be prevented from moving to the inside of the plate unit 112 through a separate cylinder. Therefore, as shown in FIG. 4, the supply material roll 1 having the materials consumed may be separated from the supply rotation shaft 111 to then fall downward. Here, the supply material roll 1 may be recovered by an operator for disposal.

Referring to FIG. 5, the supply rotation shaft 111 of the supply material unit 110 moves to be exposed such that the end 111a may again be protruded to the outside of the plate unit 112. Therefore, the supply material roll 1 may be removed, as indicated above, and the supply rotation shaft 111 without the supply material roll 1 thereon may be protruded to the outside of the plate unit 112.

Referring to FIG. 6, the transfer unit 134 of the standby material unit 130 may be extended to push the transfer plate 133 toward the supply material unit 110. Accordingly, the transfer plate 133 may push the standby material roll 2 along the coupling shaft 131, and the standby material roll 2 may be coupled to the supply rotation shaft 111 of the supply material unit 110. Thereafter, coupling of an end of the supply material roll 1 having the materials consumed to an end of the standby material roll 2 may be performed.

Accordingly, in the materials exchanging device 100 of winding equipment for a secondary battery according to an exemplary embodiment, the standby material unit 130 may be maintained orthogonal to the supply material unit 110. During exchange of the supply material roll 1 and the standby material roll 2, the standby material unit 130 may be moved to about 90 degrees with respect to the supply material roll 1 by rotating the standby material unit 130 by about 90 degrees. This configuration may reduce the size of the materials exchanging device 100.

In addition, in the materials exchanging device 100 of winding equipment for a secondary battery according to an exemplary embodiment, when materials of the supply material roll 1 are consumed, the supply rotation shaft 111 of the supply material unit 110 moves backward to remove the supply material roll 1 and the standby material roll 2 may be coupled to the supply rotation shaft through 111 through the transfer unit 134 of the standby material unit 130, thereby facilitating replacement of materials.

By way of summation and review, a positive electrode plate, a negative electrode plate, and separators may be provided in roll-shaped configurations, respectively, to then be supplied. If base materials wound on a roll are consumed, exchange of the roll with another roll may be needed.

In view of characteristics of base materials for the separator, there may be a dimensional restriction for the diameter of the separator, and rolls may need to be replaced frequently.

Accordingly, in providing an electrode assembly, an operating suspension time of winding equipment may be lengthened due to frequent replacement of rolls, thereby lowering manufacturability of a lithium ion secondary battery.

Exemplary embodiments may provide a materials exchanging device of winding equipment for a secondary battery, which may rapidly and accurately replace base materials for the secondary battery while having a simplified configuration and while occupying a reduced volume or space for installation.

As described above, in the materials exchanging device of winding equipment for a secondary battery according to exemplary embodiments, the standby material unit may be maintained to be orthogonal to the supply material unit and at about 90 degrees with respect to the supply material roll. This configuration permits reduction of the size or volume of the materials exchanging device by allowing rotation of the standby material unit by about 90 degrees when the supply material roll is exchanged with the standby material roll.

In addition, in the materials exchanging device of winding equipment for a secondary battery according to exemplary embodiments, when materials of the supply material roll are consumed, the supply rotation shaft of the supply material unit moves backward to remove the supply material roll and the standby material roll is coupled to the supply rotation shaft through the transfer unit of the standby material unit, thereby facilitating replacement of materials.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A materials exchanging device of winding equipment for a battery, the materials exchanging device comprising:
   a supply material unit to couple to a supply material roll and supplying materials to a winding member; and
   a standby material unit to couple to a standby material roll and hinged to the supply material unit,
   wherein an angle of the standby material roll with respect to the supply material unit varies based on hinge-rotation of the standby material unit to have the standby material roll face a supply rotation shaft of the supply material roll.

2. The materials exchanging device as claimed in claim 1, wherein the supply material unit includes:
   the supply rotation shaft about which the supply material roll is rotated; and
   a plate unit shaped to allow the supply rotation shaft to pass therethrough.

3. The materials exchanging device as claimed in claim 2, wherein when materials wound on the supply material roll are consumed, the supply material unit shifts the supply rotation shaft to an inside of the plate unit to replace the supply material roll with the standby material roll.

4. The materials exchanging device as claimed in claim 2, wherein the supply rotation shaft passes through a throughhole of the plate unit, and the throughhole has a smaller diameter than the supply material roll.

5. The materials exchanging device as claimed in claim 2, further comprising at least one guide roller protruding from the plate unit.

6. The materials exchanging device as claimed in claim 1, wherein the standby material unit includes:
   a second plate unit hinged to the supply material unit;
   a coupling shaft to couple to the standby material roll and protruding from one surface of the second plate unit; and
   a transfer plate positioned between the standby material roll and the second plate unit and pushing the standby material roll along the coupling shaft.

7. The materials exchanging device as claimed in claim 6, wherein the standby material unit pushes the standby material roll along the coupling shaft at a position where the coupling shaft of the standby material unit and the supply rotation shaft of the supply material unit are extended in a same line.

8. The materials exchanging device as claimed in claim 6, wherein the standby material unit further includes a transfer unit including at least one pair of support members coupled to each other about a hinge shaft between the transfer plate and the second plate unit.

9. The materials exchanging device as claimed in claim 8, wherein in an extended state of the transfer unit, the transfer plate and the second plate unit are separated from each other by a maximum distance that is longer than or equal to a length of the coupling shaft.

10. The materials exchanging device as claimed in claim 8, wherein the transfer unit applies a pressure to the transfer plate.

11. A method of manufacturing a battery, the method comprising;
supplying a first separator from a first separator roll, a second separator from a second separator roll, a negative electrode plate from a negative electrode plate roll, and a positive electrode plate from a positive electrode plate roll;
stacking the first separator, the negative electrode plate, the second separator, and the positive electrode plate such that a stacked structure is formed;
rotating the stacked structure in one direction with a winding member;
exchanging one of the first separator roll, the second separator roll, the negative electrode plate roll, or the positive electrode plate roll with a standby material roll using the materials exchanging device of claim 1.

12. A method of manufacturing a battery, the method comprising;
supplying a plurality of supply material rolls, each of the supply material rolls including material of at least one of a first separator, a second separator, a negative electrode plate, and a positive electrode plate;
stacking the material of the plurality of supply material rolls such that a stacked structure is formed;
rotating the stacked structure in one direction with a winding member;
exchanging one of the supply material rolls with a standby material roll using a materials exchanging device,
wherein the materials exchanging device includes:
a supply material unit coupled to at least one of the supply material rolls and supplying the material of the at least one supply material roll to the winding member; and
a standby material unit coupled to the standby material roll and hinged to the supply material unit,
wherein an angle of the standby material roll with respect to the supply material unit varies based on hinge-rotation of the standby material unit to have the standby material roll face a supply rotation shaft of the supply material roll.

* * * * *